United States Patent [19]

Papadopoulos

[11] Patent Number: 5,103,414
[45] Date of Patent: Apr. 7, 1992

[54] METHOD FOR TRUEING SPOKED WHEELS

[75] Inventor: Jeremy J. M. Papadopoulos, Sycamore, Ill.

[73] Assignee: Cornell Research Foundation, Inc., Ithaca, N.Y.

[21] Appl. No.: 468,870

[22] Filed: Jan. 23, 1990

[51] Int. Cl.⁵ .............................................. B21K 1/34
[52] U.S. Cl. .......................... 364/571.01; 33/203.16
[58] Field of Search ............ 364/550, 551.01, 571.01, 364/571.02, 571.05, 580, 508; 29/894.33, 894.331, 894.332, 894.333; 157/1.5, 1.55; 33/203, 203.12, 203.15, 203.16

[56] References Cited

U.S. PATENT DOCUMENTS

| | | | |
|---|---|---|---|
| 3,507,027 | 4/1970 | Jaulmes | 29/705 |
| 4,045,852 | 9/1977 | Winch | 29/894.33 |
| 4,126,942 | 11/1978 | Damman | 33/203.16 |
| 4,143,464 | 3/1979 | Lahos | 33/203.16 |
| 4,187,895 | 2/1980 | Saruwatari et al. | 157/1.55 |
| 4,417,237 | 11/1983 | Korth | 340/540 X |
| 4,585,046 | 4/1986 | Buckley | 157/1.55 |

FOREIGN PATENT DOCUMENTS 1483501 8/1973 U.S.S.R. ............................... 157/1.5

Primary Examiner—Parshotam S. Lall
Assistant Examiner—M. J. Zanelli
Attorney, Agent, or Firm—Jones, Tullar & Cooper

[57] ABSTRACT

A method for trueing a spoked wheel, such as a bicycle wheel, is disclosed. Measurement data on lateral and radial runout and spoke tension all around a wheel is obtained, and the necessary spoke adjustments to true the wheel are determined from the data so that the wheel can be trued in a single pass or spoke adjustments. In one embodiment of the invention, individual influence functions for each spoke of a wheel which relate the effect of each spoke adjustment to the change in lateral runout and radial runout of the entire wheel rim, as well as on all spoke tension, are obtained. These, combined with measured data of a wheel, are utilized to determine the individual spoke adjustments that are required to true the wheel. A least squares solution can be utilized on a computer to solve for each of the spoke adjustments, and weighting factors can be employed to vary the accuracy of the lateral or radial trueness, or the spoke tensions.

9 Claims, 6 Drawing Sheets

METHOD FOR TRUEING SPOKED WHEELS

Appendix A contains computer source code which has not been reproduced, but is on file in the application papers.

BACKGROUND OF THE INVENTION

The present invention relates, in general, to a method for trueing spoked wheels.

The task of adjusting spokes in order to pull a spoked wheel, such as a bicycle wheel, into an accurate circular configuration, i.e., to true the wheel, is traditionally performed iteratively. That is, small adjustments are made to many or all of the spokes all around the wheel, and this step is repeated for several or perhaps many revolutions of the wheel. If performed manually by a skilled person, this job is slow and tedious, while machines constructed for this purpose are expensive, cannot achieve the tolerances of a better quality wheel and may under or overtension the spokes. There are a number of reasons for these difficulties. First, wheel rims tend to have imperfections, so it is not adequate simply to set all of the spoke lengths or tensions identically. Further, adjusting any one spoke effects the shape and the tensions of the entire wheel. Even a slightly untrue wheel with relatively uniform tensions may have extremely nonuniform tensions if forced to be perfectly true.

SUMMARY OF THE INVENTION

It is therefore the object to the present invention to provide a method for trueing spoked wheels which enables a wheel to be quickly and accurately trued and tensioned without repeated adjustments of the spokes.

This, and other, objects of the invention are achieved by utilizing information on radial and lateral wheel rim position and spoke tensions all around the wheel combined with a knowledge of the relationship between these quantities and spoke adjustments around the wheel. Using this information, the net spoke adjustments necessary to true a wheel can be determined and a wheel can be trued with a single pass of spoke adjustments.

A preferred embodiment of the invention makes use of linear equations which describe changes in tension, and in lateral and radial position, at every spoke of a wheel, in terms of adjustments to all of the spokes. For each spoke of the wheel, there are three equations that are a function of spoke adjustment: one equation relates the tension change in that spoke to arbitrary adjustment of it and all other spokes. A 15 second and a third relate the radial and lateral position change, respectively, of the point on the wheel rim where the spoke is attached, to the arbitrary adjustment of all of the spokes. Therefore, for a standard 36 spoke wheel, 108 equations are required which may be determined experimentally or theoretically.

Given 108 equations defining changes in all of the spoke tensions and in the lateral and radial runout all around the wheel in terms of 36 spoke adjustments, and given 108 desired tension and lateral and radial runout corrections, the 36 unknown spoke adjustments which will most nearly provide these corrections can be solved for by computer. Since it is usually impossible to exactly solve 108 equations in 36 unknowns, the preferred embodiment of the present invention makes use of a least-squares approach, which minimizes the sum of the squares of the tension errors, lateral errors and the radial errors. This provides a compromise solution, however the user may vary the relative importance of each of the three types of errors by assigning a different weighting factor to each of them, as is used in the least squares approach.

The present invention therefore provides a technique whereby an untrue spoked wheel can be trued by determining the required net spoke adjustments from a knowledge of the present spoke tensions and radial and lateral rim runout around the entire wheel.

BRIEF DESCRIPTION OF THE DRAWINGS

The objects, features, and advantages of the present invention will become apparent from a consideration of the following detailed description of a preferred embodiment thereof, taken in conjunction with the accompanying drawings, in which.

DETAILED DESCRIPTION OF A PREFERRED EMBODIMENT

Figure 1A:
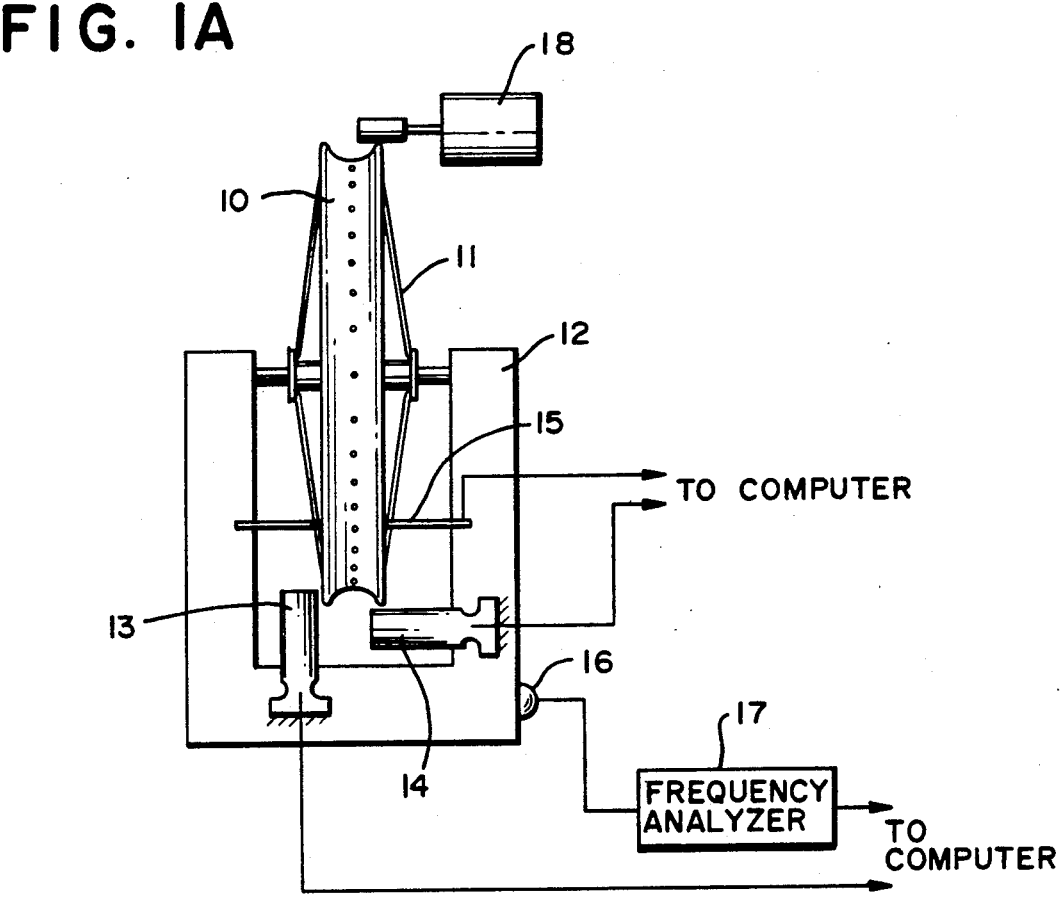
FIG. 1A is a diagrammatic front elevation of a spoked wheel illustrating devices for measuring lateral and radial runout and spoke tensions.

Turning now to a more detailed consideration of the present invention, there is illustrated in FIG. 1A, a spoked wheel 10 which is to be trued in accordance with the method of the present invention by adjustment of a plurality of spokes 11, and is positioned on a trueing stand 12. In order to true the wheel in accordance with a preferred embodiment of the invention, the wheel's lateral runout, radial runout and individual spoke tensions must be measured first. This can be accomplished using any suitable technique.

One technique, as illustrated in FIG. 1A, is to utilize a first strain gauge displacement transducer 13 for measuring the lateral runout of the wheel, a second strain gauge displacement transducer 14 for measuring the radial runout of the wheel, and, a spoke plucking device 15 attached to stand 12 for measuring the tensions of each of the spokes ii. A microphone 16 is attached to stand 12 for sensing the pitoh of the sounds generated by the spokes as they are plucked. The pitch is directly related to the spoke tension and is determined by a frequency analyzer 17 that is connected to the microphone 16. Signals from transducers 13 and 14, spoke plucking device 15 and frequency analyzer 17, are fed to a computer (not shown) for processing and recording the data measurements. The signals from plucking device 15 are used to trigger the computer to read the signals from microphone 16 and displacement transducers 13 and 14. A drive unit 18 engages wheel 10 to slowly rotate it as the measurements are taken.

For a variation on this measurement technique, the radial runout of both rim flanges of a wheel could be measured if desired to measure rim twist. This can be accomplished simply by utilizing two displacement transducers in place of the second strain gauge transducer 14, one for each flange of the wheel rim. Another suitable measurement technique would be to clamp a wheel to be trued so that it is radially and/or laterally true, and then measure clamping forces at selected circumferential points, from which radial and/or lateral runout can be calculated.

Figure 1B:
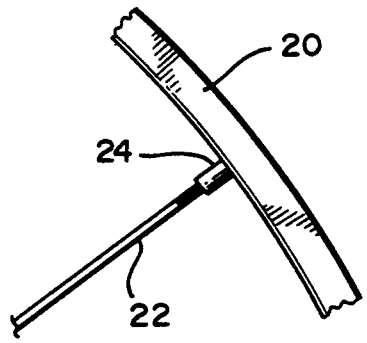
FIG. 1B is an enlarged diagrammatic illustration of a portion of a spoke connected to a wheel rim.

As is well known in the art, wheel spokes are adjusted by turning nipples that are attached to the wheel rim and are threaded onto the ends of the spokes. FIG. 1B shows a portion of a wheel rim 20, a threaded spoke 22 and a threaded nipple 24. Thus, when the nipples are turned with a spoke wrench, the effective length of the spokes will be either increased or decreased, depending on which direction the nipples are turned. It can be determined either through experimentation or mathematical analysis that the adjustment of any one spoke on a wheel will have an influence not only on the tension, lateral runout and radial runout at that spoke, but also to some degree on these quantities at every other spoke on the wheel. Thus, each spoke of the wheel can be said to possess three influence functions: a lateral influence function, a radial influence function and, a tension influence function. These functions provide a good way to formulate equations for predicting tension and runout changes all around the wheel due to arbitrary adjustments to all of the spokes. (The influence function approach fails, however, if any spokes are completely loose before or after adjustment.) Each of these functions will be discussed in turn below.

The lateral influence function defines how much the lateral runout of the wheel will change at every spoke location as a result of a given adjustment of one spoke. To determine it, spoke number 1 of a well trued wheel was shortened by turning its adjustment nipple one full turn. The effects of this adjustment at each of the 36 spokes of the wheel are graphically illustrated in FIG. 2. As might be expected, the lateral position of the wheel rim at spoke number 1 was changed to most (0.030 inches). The graph further indicates that about 10 other spokes also experienced a significant positive lateral position change as a result of the adjustment to spoke number 1. In addition, about a dozen of the spokes actually experienced a slight negative lateral position change.

Figure 2:
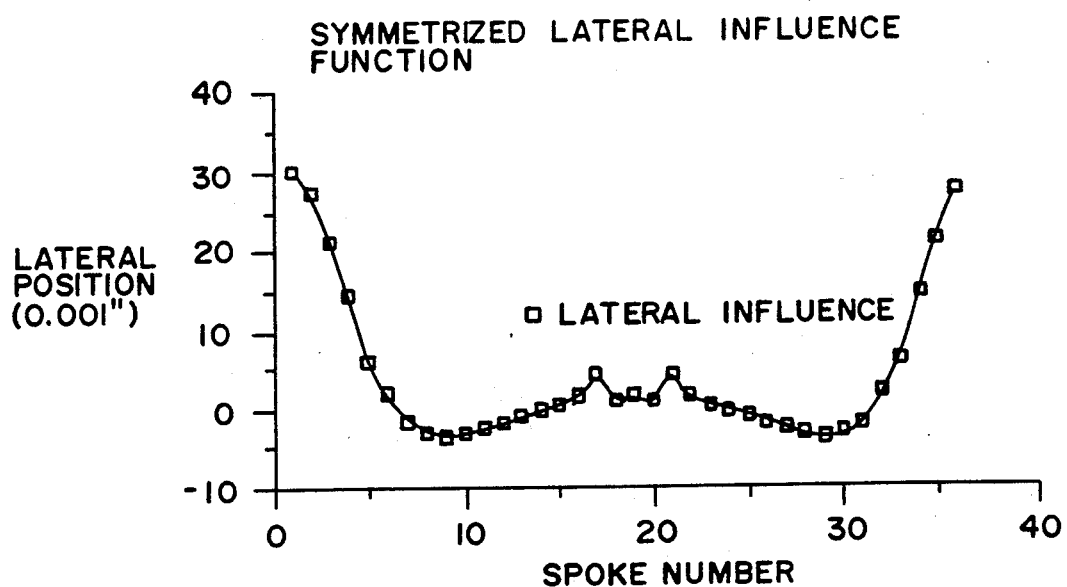
FIG. 2 is a graphical illustration of the experimentally determined change in lateral wheel rim position at every spoke of a wheel due to the adjustment of one spoke (here defined as number 1)

The graph in FIG. 2 represents the lateral influence function for spoke 1 of the test wheel. It has been found that the lateral influence functions for each of the remaining 35 spokes are usually very similar, although as should be understood, the graph of the function would be shifted to center on the spoke adjusted, and would be reversed in sign for spokes pulling towards the opposite side. From these functions, the total change to the lateral runout of the wheel as a result of arbitrary adjustments to any number of the spokes can be determined simply by multiplying each of the lateral influence functions of the adjusted spokes times the number of nipple turns for that spoke, and adding together the effects at each spoke to determine net lateral displacements.

Figure 3:
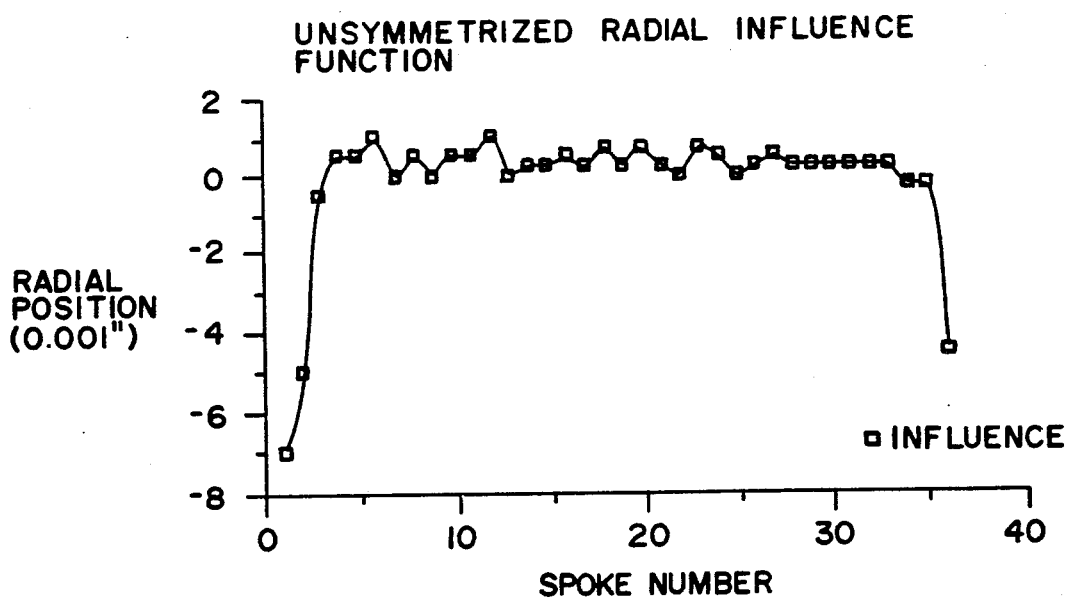
FIG. 3 is a graphical illustration of the experimentally determined change in radial wheel rim position at every spoke of a wheel due to the adjustment of one spoke.

The radial influence function behaves in the same manner as the lateral influence function and is graphically illustrated in FIG. 3 for spoke number 1 of the 36 spoke test wheel. Again, the graph indicates the amount of change in thousandths of an inch of the radial position of the wheel at each of the spoke locations for a one-turn adjustment to spoke number 1. As can be seen from the graph, the most significant radial position changes occur at the two spokes on either side of the adjusted spoke, but there are also changes at most of the other spokes.

Figure 4:
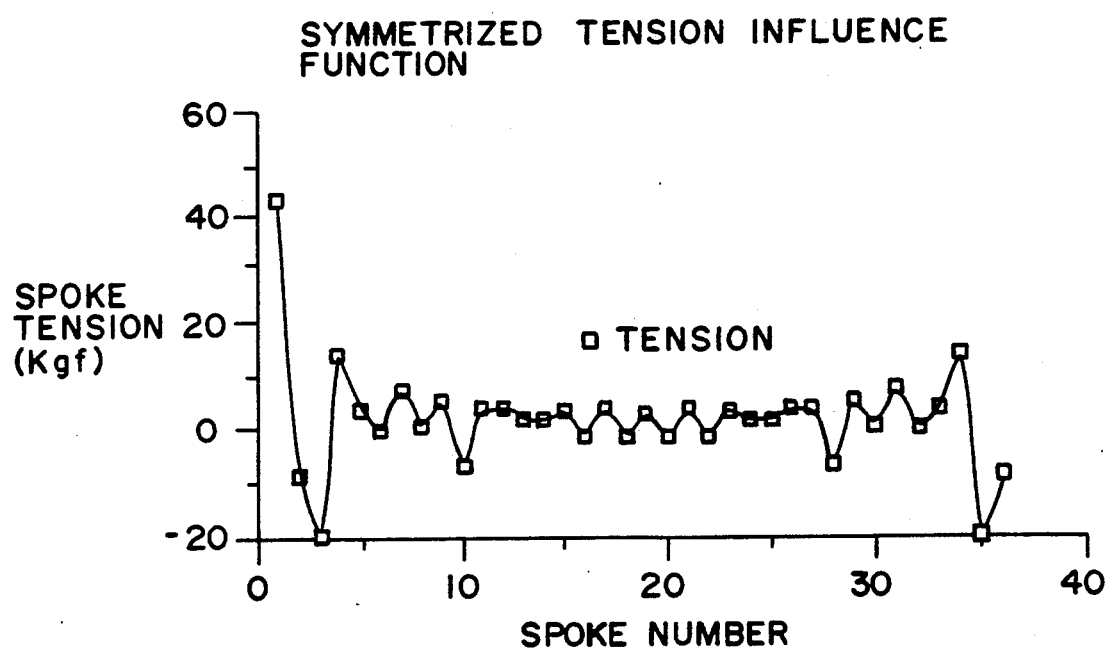
FIG. 4 is a graphical illustration of the experimentally determined change in tension of every spoke of a wheel due to the adjustment of one spoke.

Finally, the spoke tension influence function for spoke number 1 of the 36 spoke test wheel is graphically illustrated in FIG. 4. Again, the tension of the spokes nearest the adjusted spoke is varied the most. When spoke number 1 is shortened, its tension obviously increases. Where the radial influence shows the wheel pulled inwards, i.e. at the two spokes on either side of spoke number 1, tension is lowered. Other spokes change tension based on lateral displacement, which makes alternate spokes tight and loose.

The above influence functions for each of the spokes of the wheel can be utilized to calculate the spoke adjustments needed to true a wheel. Ideally, a perfectly trued wheel will have zero lateral and radial runout, and equal spoke tensions. In the real world, however, the rim's imperfections make this impossible to achieve. For example, lateral runout could be completely eliminated, but then radial runout and tension variations would be excessive. If radial and lateral runout were reduced to a minimum, some spokes would be so loose, that they would get even looser from riding vibrations, and some would be so tight that they would fatigue rapidly. The goal of trueing a wheel is therefore not to attempt to make the wheel perfectly true, but instead, to obtain a compromise among lateral and radial runout and spoke tension, which will bring each of these three variables within acceptable tolerances.

The conventional approach to trueing a spoked wheel is to utilize an iterative process, either with a machine or by hand, wherein the spokes of a wheel are adjusted and readjusted a number of times until the wheel is within acceptable tolerances. The reason that this process must be repeated a number of times is clearly evident from the influence functions illustrated in FIGS. 2–4. If one of the spokes is adjusted to reduce its lateral runout to an acceptable level, its tension and radial position may be made worse. Further, the subsequent adjustment of another spoke on the wheel will most likely cause the lateral runout to go back out of tolerance. This occurs each time another spoke is adjusted, so it is clear that the correct trueing of a spoked wheel using this technique requires both skill and time.

In contrast, the present invention provides a technique whereby wheel rim measurements taken all around a wheel are used to determine the net spoke adjustments needed to true the wheel, and then the spoke adjustments are made in a single pass around the wheel.

Using the 36 spoke test wheel as an example, the method of a preferred embodiment of the present invention is as follows. As stated previously, there are 36 lateral influence functions, 36 radial influence functions and, 36 tension influence functions, although typically only one of each type need be found. These influence functions are utilized in conjunction with lateral and radial runout and tension data for each of the spokes of the wheel to solve for the 36 necessary spoke adjustments.

To best illustrate the process for solving for the spoke adjustments, matrix notation will be employed. In this form, the 36 radial influence functions, for example, would be written as the 36 columns of a square matrix as follows:

$$[A_R] = \begin{bmatrix} R_1 R_{36} R_{35} & \cdots & R_2 \\ R_2 R_1 R_{36} & \cdots & R_3 \\ R_{36} R_{35} R_{34} & \cdots & R_1 \end{bmatrix}$$

In the matrix, successive columns contain the same numbers, $R_1$-$R_{36}$, shifted downwards to center about a different adjusted spoke. If this square matrix is multiplied by a column vector of 36 spoke adjustments, the resulting column vector will be the changes in radial position at spokes 1-36 due to the given adjustments.

The matrices for the lateral and tension influence functions, $[A_L]$ and $[A_T]$, are formed in the same manner as $[A_R]$. Since lateral runout is defined as positive to the right side of the wheel, however, alternating columns in $[A_L]$ have negative coefficients due to the spokes of the wheel alternating from the left and the right side of the wheel hub. The coefficients in the columns of each matrix are those values obtained for each spoke in the graphs of FIGS. 2-4.

If it is desired to correct only the lateral runout of the wheel, the following matrix equation is employed:

$$[A_L]*(x) = (b_L) \qquad (1)$$

where (x) is a 36×1 vector of spoke turns or adjustments, and $(b_L)$ is a 36×1 vector of desired lateral rim position changes. The values of $(b_L)$ are obtained by subtracting the measured lateral runout from the desired lateral runout (i.e., from zero). (Tension and radial correction vectors $(b_T)$ and $(b_R)$ are defined similarly.) The 36 spoke adjustments (x) which will provide the desired runout are thus obtained by simultaneously solving the 36 equations given by $[A_L]$. Therefore, determining the necessary spoke adjustments to make the wheel perfectly laterally true can be easily performed on a computer through a simultaneous solution of linear equations. This applies as well if it is desired to make a wheel radially true without regard to lateral runout or spoke tension, or if it is desired to equalize spoke tensions around a wheel without regard to lateral and radial runout.

Unfortunately, this technique does not work if simultaneous solutions of all of the lateral, radial and tension equations are desired. In this case, there are 36 unknowns and 108 equations, and an exact solution usually does not exist. Therefore, some form of compromise solution technique must be employed. One such technique is the well known method of weighted least squares illustrated below which minimizes the weighted sum of the squares of the lateral, tension, and radial errors. In adopting a compromise solution, exact solutions in any one area are foregone. However, the importance of each of the three variables, lateral and radial runout and tension, can be varied by changing the weighting factor assigned to each matrix equation.

In the least squares approach, all 108 equations are written in the matrix form:

$$[A_E]*(x) = (b_E) \qquad (2)$$

where $[A_E]$ is the 108×36 matrix:

$$\begin{bmatrix} w_L * A_L \\ w_T * A_T \\ w_R * A_R \end{bmatrix}$$

(x) is a 36×1 vector of spoke adjustments;
$(b_E)$ is the 108×1 vector:

$$\begin{bmatrix} w_L * b_L \\ w_T * b_T \\ w_R * b_R \end{bmatrix}$$

and $w_L$, $w_T$ and $w_R$, are scalar Weighting factors for variably emphasizing the importance of the lateral, radial and tension trueing criteria, respectively. If runout is measured in thousandths of an inch, and tension is measured in pounds, setting $W_L$, $W_T$ and $W_R$ to 1.0 will provide reasonable results.

The least squares solution involves multiplying both sides of equation (2) by the transpose of $[A_E]$ yielding:

$$[A_E^{T*}A_E]*(x) = [A_E^{T*}b_E] \qquad (3)$$

Equation (3) is in the form:

$$[A]*(x) = (b) \qquad (4)$$

where $[A] = 36 \times 36$ symmetric matrix
$= w_L^{2*}[A_L^{T*}A_L] + w_T^{2*}[A_T^{T*}A_T] + w_R^{2*}[A_R^{T*}A_R]$ and $(b) = 36 \times 1$ vector
$= w_L^{2*}(A_L^{T*}b_L) + w_T^{2*}(A_T^{T*}b_T) + w_R^{2*}(A_R^{T*}b_R)$ Thus, equation (3) is actually a matrix of 36 equations in 36 unknowns which can be solved by standard methods.

Therefore, in this embodiment of the present invention, the following six steps are employed to true a wheel:

(1) Form $[A_L]$, $[A_T]$ and $[A_R]$ from previously determined influence functions (pertaining to the wheel being trued, or one similar to it).
(2) Measure the wheel to determine the desired correction vectors $(b_L)$, $(b_T)$, $(b_R)$.
(3) Assign Weighting factors $w_L$, $w_T$, $w_R$.
(4) Form least-squares matrix equation, $[A]*(x) = (b)$.
(5) Solve equation for net spoke turns minimizing weighted lateral/radial/tension variations.
(6) Apply spoke turns to the wheel being trued.

Optionally, before step 6 the obtained spoke turns can be used to predict the final shape/tension, and the analysis ca be repeated with different weighting factors if greater accuracy in any one aspect (e.g. radial runout) is desired.

Figure 5:
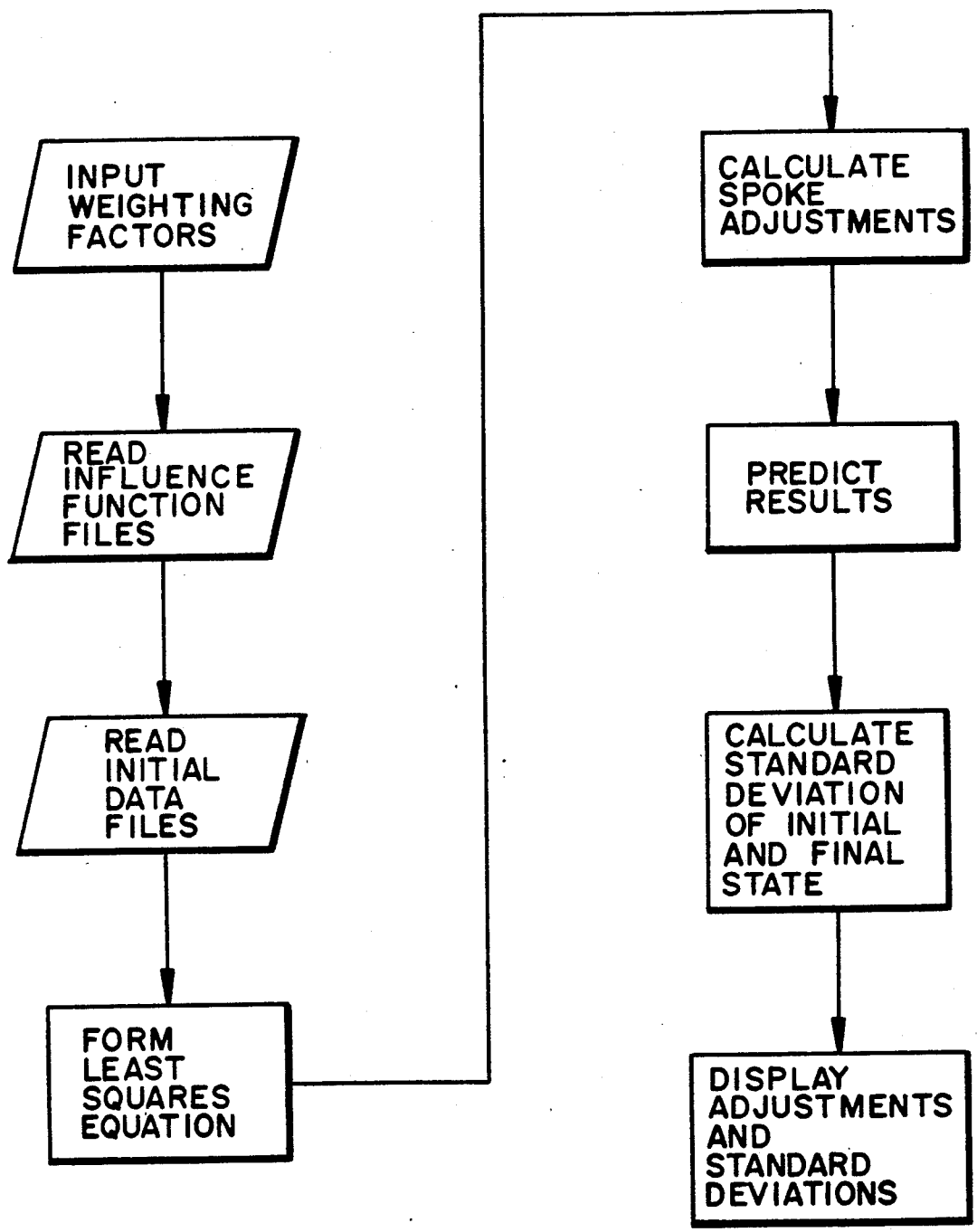
FIG. 5 is a flow chart for a computer program which implements the procedure of the present invention; and, FIGS. 6A–C are graphical illustrations of actual initial and final lateral positions, spoke tensions and radial positions, respectively, of a test wheel.

The above steps can be easily implemented on a computer using any appropriate algorithm. For the test wheel, a Fortran program was written which follows the flow chart illustrated in FIG. 5. The program sequence is as follows:

(1) user inputs weighting factors;
(2) previously created influence function files and initial data files are read;

(3) least-squares equations are formed;
(4) individual spoke turns required to minimize weighted variations in lateral position, spoke tension and radial position are calculated;
(5) the post-adjustment tensions, lateral and radial shape from the spoke adjustments are predicted; and,
(6) the sum of squared lateral, radial and tension errors are calculated for the initial and final (theoretical) states.

The Fortran program used to implement the algorithm is contained in Appendix A (not printed here, but available in application papers). In the program, the user inputs the initial measurements of the wheel via three data files: initlat.d, initen.d and initrad.d. These correspond to the initial measurements of the lateral position, spoke tensions and radial position, respectively. The influence functions are entered through three data files: inflat.d, inften.d and infrad.d. For development purposes, the desired final positions and tensions were computed as the average of the initial data, but in practical use such quantities would be specified by the user.

Preliminary experiments with crude instrumentation were conducted to test the operation of the program. First, a test wheel was purposely adjusted into a state of considerable misalignment with a high degree of spoke tension disparity. The initial state of the wheel was then measured and entered into the appropriate data files. The program was run with the weighting factors equal to 1.

The results of the experiment are summarized in the table below:

| | Standard Deviation of Wheel Data | | |
|---|---|---|---|
| | Lateral Position (0.001") | Radial Position (0.001") | Spoke Tension (Kgf) |
| Test wheel: Initial | 17.8 | 19.4 | 21.9 |
| Test wheel: Predicted Final | 3.92 | 6.13 | 7.95 |
| Test Wheel: Actual Final | 2.88 | 8.3 | 5.97 |
| Second Iteration Predicted Final | 2.42 | 2.99 | 4.22 |
| Second Iteration Actual Final | 2.68 | 3.93 | 4.52 |
| Test Wheel Expertly Trued | 2.57 | 1.82 | 14.5 |

Figure 6A:
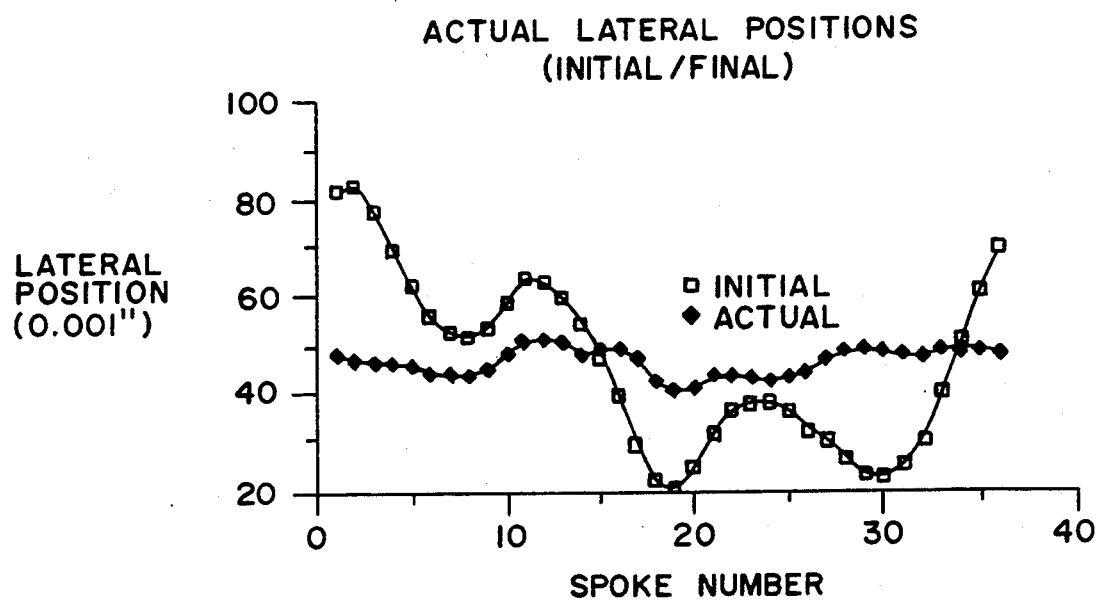
Figure 6B:
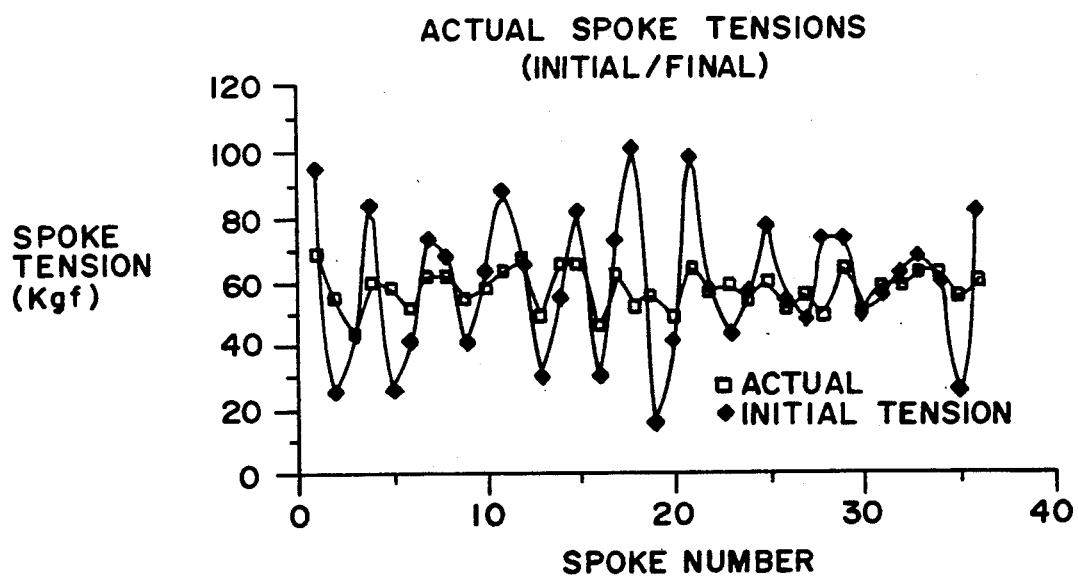
Figure 6C:
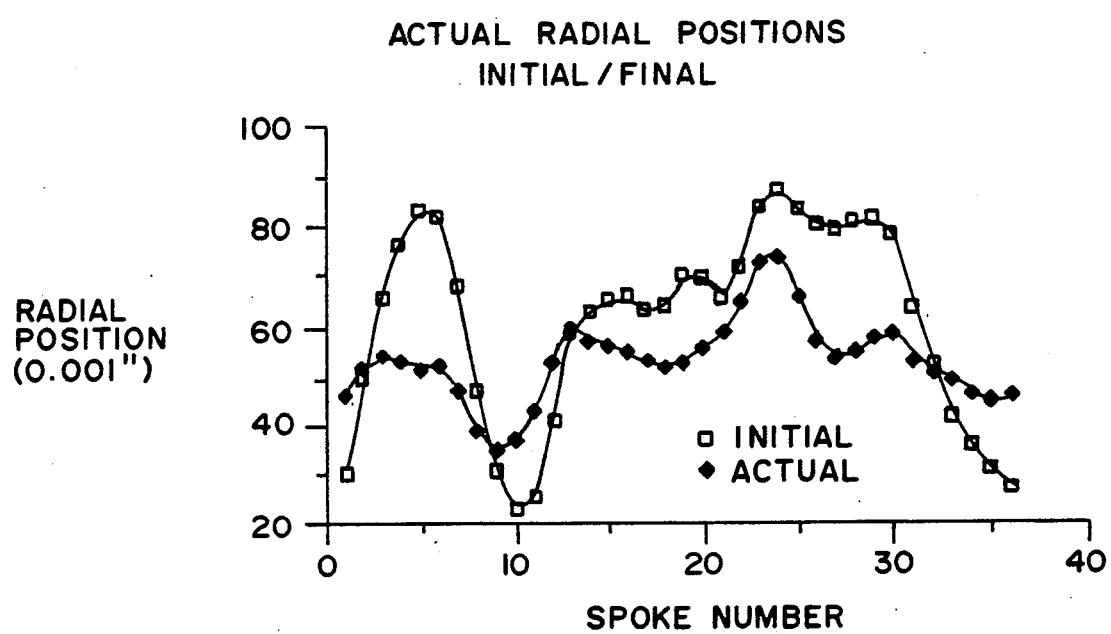

The spoke turns predicted by this computer analysis were then applied to the test wheel. The results are shown in the table above, and are graphically illustrated in FIGS. 6A-C, and were quite encouraging. The lateral runout (FIG. 6A) showed excellent improvement. The final graph of the final shape is quite level and rather smooth. In comparison, the graph of the spoke tensions (FIG. 6B) is fairly level but more jagged. The radial position, whose final graph was neither level nor smooth, had the worst final variation in shape (FIG. 6C). In addition, the shape of this final graph looks somewhat like the original. From this experiment, it seems that the experimental influence function has less effect on the actual wheel than predicted, suggesting that it was not measured correctly in these early trials.

A second iteration was performed using the new shape/tensions measured after the first spoke adjustment. After the second run, all of the predicted standard deviations were rather good. However, the actual values were slightly worse than predicted. The fact that predicted and actual shapes differ implies that there could have been a problem with any or all of: (a) the measuring technique, (b) the precision with which the spokes were adjusted, or (c) the accuracy of the influence functions.

The results in the above experiments are quite promising. After the single iteration, the errors in literal shape and spoke tension were reduced to the tolerances established by an expert trueing the same wheel. However, the error in radial shape, although significantly improved, was quite a bit worse than that of the expertly trued wheel, indicating that different weighting factors should have been used in the experiment. Since the spoke tension variation was approximately three times better than that achieved in the expertly trued wheels, it is important to de-emphasize its the importance of the spoke tension by lowering its weighting factor in relation to the other two criteria. This would result in better approximate solutions for the lateral and radial shapes. In addition, to obtain the degree of roundness achieved by the expert, the radial weighting factor should be larger than the lateral weighting factor.

In conclusion, the present invention provides a method for adjusting spoked wheels which eliminates the guess work employed in traditional wheel trueing techniques, which require repeated spoke adjustments to true a wheel. Instead, measured wheel data around the wheel can be utilized to determine the particular spoke adjustments that are required to true the wheel. This procedure therefore provides a means by which a spoked wheel can be trued in a single pass, i.e., the wheel can be trued with no more than one adjustment to each of its spokes.

Although the invention has been disclosed in terms of a preferred embodiment, it will be understood that numerous modifications and variations could be made thereto, without departing from the true spirit and scope of the invention as set forth in the following claims.

What is claimed is:

1. A method for trueing in a single pass, a spoked wheel having a wheel rim and a plurality of adjustable spokes, said method comprising the steps of:
    obtaining wheel imperfection data from said spoked wheel;
    obtaining a group of influence functions, one for each spoke of said wheel, which represent the influence on said wheel caused by predetermined adjustments of each spoke of said wheel;
    determining from said obtained wheel imperfection data and said obtained group of influence functions, the individual spoke adjustments that are necessary to true said wheel in a single pass; and
    making the determined spoke adjustments to said wheel.

2. The method of claim 1, wherein the step of obtaining wheel imperfection data comprises obtaining laterla and radial runout data all the way around said wheel.

3. The method of claim 2, wherein the step of obtaining wheel imperfection data comprises obtaining spoke tension data all the way around said wheel.

4. The method of claim 1, wherein the step of determining the individual spoke adjustments includes obtaining a least squares solution to a plurality of equations which relate each of said influence functions and said obtained data to the individual spoke adjustments required to true said wheel.

5. The method of claim 4, wherein said step of determining the individual spoke adjustments further includes assigning weighting factors to said group of influence functions to improve the accuracy of the obtained least squares solution.

6. The method of claim 1, wherein the step of obtaining a group of influence functions further comprises:
   obtaining a group of lateral influence functions, one for each spoke of said wheel, which represent the influence on the lateral position of said wheel rim caused by predetermined adjustments of each spoke of said wheel;
   obtaining a group of radial influence functions, one for each spoke of said wheel, which represent the influence on the radial position of said wheel rim caused by predetermined adjustments of each spoke of said wheel; and
   obtaining a group of spoke tension influence functions, one for each spoke of said wheel, which represent the influence on each of the spoke tensions of said wheel caused by predetermined adjustments of each spoke of said wheel.

7. The method of claim 6, wherein said step of determining the individual spoke adjustments includes obtaining a least squares solution to a plurality of equations which relate each of said influence functions and said obtained data to the individual spoke adjustments required to true said wheel.

8. The method of claim 7, wherein said step of determining the individual spoke adjustments further includes assigning weighting factors to each group of influence functions to improve the accuracy of the obtained least squares solution.

9. A method for trueing in a single pass, a spoked wheel having a wheel rim and a plurlaity of adjustable spokes said method comprising the steps of:
   obtaining wheel imperfection data from said spoked wheel;
   determining the influence of the imperfections of the wheel caused by predetermined adjustments of one or more spokes of said wheel; and,
   determining from said obtained wheel imperfection data and said determined influence, the individual spoke adjustments that are necessary to true said wheel in a single pass; and
   making the determined spoke adjustments to said wheel to thereby true said wheel in a single pass.

* * * * *